Jan. 16, 1951            D. J. SMITH            2,538,476

AUTOMATIC SENTINEL FOR AUTOMOBILE GENERATORS

Filed July 18, 1949

Inventor

Daniel J. Smith

By *Clarence A. O'Brien and Harvey B. Jacobson*

Attorneys

Patented Jan. 16, 1951

2,538,476

UNITED STATES PATENT OFFICE 2,538,476

AUTOMATIC SENTINEL FOR AUTOMOBILE GENERATORS

Daniel J. Smith, Beaumont, Tex.

Application July 18, 1949, Serial No. 105,285

3 Claims. (Cl. 171—252)

This invention relates to a thermal protective switch adapted for use in automobile generators.

More specifically, this invention relates to a thermostatic control which is adapted for general application in connection with generators, but which is particularly useful in connection with the generators used in automotive vehicle electrical systems.

The principal object is to provide improved means to short circuit a generator operating at temperatures above a predetermined limit, in order to allow the generator to run idle under no load condition until the temperature falls off to a safe point for efficient operation, whereupon the generator will again be connected for charging service.

A further purpose is to provide means whereby an automobile generator may be set to run at temperatures below a given limit.

Figure 1:
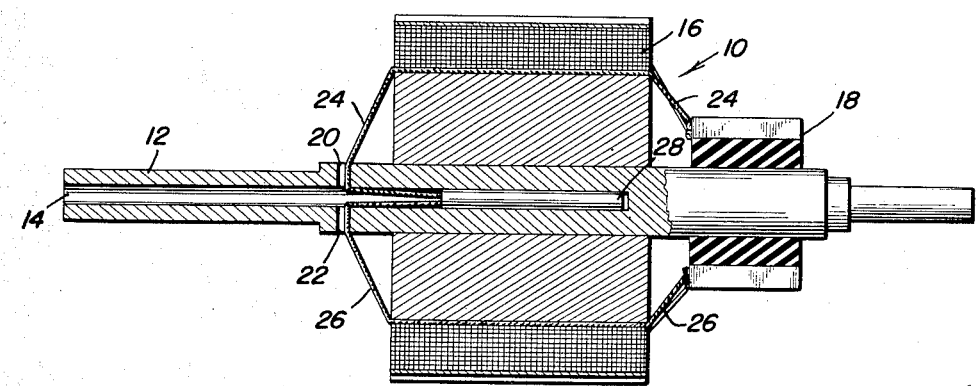
Figure 2:
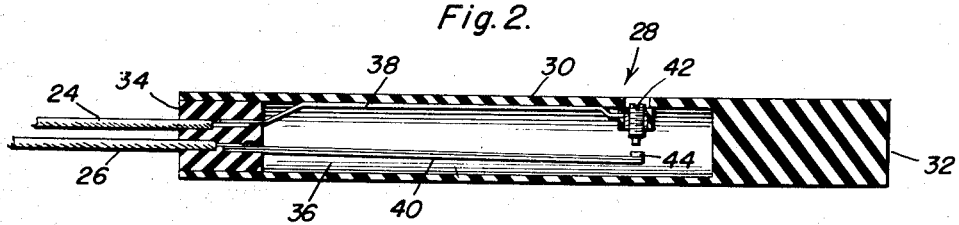

These, together with various ancillary objects of the invention which will later become apparent as the following description proceeds, are realized by this invention, one embodiment of which has been illustrated by way of example only in the accompanying drawings, wherein:

Figure 1 is a vertical sectional view showing the invention in its preferred embodiment, and Figure 2 is an enlarged vertical sectional view showing a portion of Figure 1 in detail.

Reference is now made more particularly to the accompanying drawings, wherein like numerals indicate similar parts throughout the several views, and wherein reference numeral 10 generally designates a generator assembly. This generator assembly 10 comprises an armature shaft 12 having a bore 14 extending therein. This bore 14 may extend longitudinally throughout the length of the armature shaft 12, or may be started at either end of said armature shaft and terminate at any desired point. A conventional armature coaxial with said armature shaft and having a laminated core is provided with suitable coils wound thereon. These coils are generally designated by the reference numeral 16. When the armature shaft 12 is rotated these coils 16 cut the lines of magnetic flux surrounding the armature and emanating from magnetic elements, not shown, forming another part of the generator assembly. Thus current will be induced in these coils 16 which are suitably operatively connected to a commutator 18.

A pair of apertures 20 and 22 are drilled into the armature shaft 12 and intersect the bore 14. These apertures 20 and 22 are of relatively small cross section.

Lead wires 24 and 26 from the commutator through the armature core enter the armature shaft 12 through the apertures 20 and 22, respectively. Within said bore 14 they are electrically secured to a thermal responsive switch 28.

The thermal responsive switch 28 comprises cylindrical side walls 30 having an integral end closure wall 32 and a removably emplaced end closure wall 34. Partially embedded within said end closure wall 34 are said lead wires 24 and 26. The cylindrical side walls 30 and the end closure 32 and 34 describe a hollow portion 36. These side walls and the end closure walls are all constructed from an insulative non-conducting material.

Partially embedded within said end closure wall 34, in electrical contact with the lead wires 24 and 26 are electrical conducting strips 38 and 40 extending into the hollow space 36. The contact strip 38 terminates in a threadedly adjustable contact point 42. This contact point 42 is readily adjustable to a purpose to be further explained. The contact strip 40 is composed of a laminated layer of two metals as is commonly used in a conventional thermostat. The coefficient of expansion of the outer layer of metal is larger than that of the inner layer. The contact strip 40 also terminates in a contact point 44. Thus it can be seen that due to the differences in expansion between the bimetallic layers of member 40 the contact points 42 and 44 will meet each other at a predetermined temperature which can be set by the adjustable point 42.

Very little difference exists in the temperature of the bore 14 of the armature shaft 12, and that which exists in the armature coils 16 themselves. This difference can easily be calculated. A critical temperature exists in the operation of these generators, which is circa 340 degrees F., this being the temperature at which solder used in the generator assembly will begin to melt or flow. The thermal responsive switch 28 can be set by means of adjustable point 42 so that the bimetallic strip 40 will cause contact 44 and contact point 42 to close the circuit between lead wires 24 and 26, thus short-circuiting the armature windings 16. This will provide a low resistance permitting the generator to idle along under no load conditions until the temperature within the armature core and windings is reduced. When the temperature falls off to a safe point for efficient operation, this usually taking between 5 to 15 minutes, the circuit opens as points 42 and 44 will no longer contact each other, whereupon the generator will again begin functioning and charging.

Under ordinary operation of the generator, the temperature will be below the setting of the contact points 42 and 44, and the circuit between lines 24 and 26 will be open so that the generator will charge. If, for any reason, as for example, continuous charging at a relatively high rate or charging at an excessively high rate, the temperature of the generator rises to a dangerous point, the strip 40 will deflect contact point 44 against contact point 42 to thereby short the circuit. Under such short circuit, the generator merely runs idle as under no load condition, and as soon as the temperature drops back toward normal, the circuit between the elements 42 and 44 will open and the generator will then start charging. If at intervals, such as 30 minutes or less, the generator cuts in and out during normal operation, defective structure within the generator assembly will be apparent. The driver of an automobile need but look at his ammeter on his dash to determine whether his generator is charging or not during normal operation of his automobile, thusly intermittent charging by the generator will inform the driver of the automobile that his generator is acting improperly.

From the foregoing, the manner of construction of the device and of employing the same in its numerous uses will be readily understood and further explanation is accordingly believed to be unnecessary. Since numerous modifications and changes will readily occur to those skilled in the art after a consideration of the foregoing specification and accompanying drawings, it is not intended to limit the invention to the exact construction shown and described, since this is regarded as illustrative of the principles and possibility of the device only, and in no way limiting as to the utility thereof. Accordingly, it is not intended to limit the scope of the invention to the specific embodiment shown and described, but various changes in size, shape, and arrangement of parts may be made without departing from the spirit of the invention except as limited by the appended claims.

Having described the invention, what is claimed as new is:

1. In an automobile generator, an armature shaft having a central bore, a thermal responsive switch in said bore, coils positioned about said armature shaft, said switch being located within the confines of said coils, means operatively connecting said coils to said switch, said switch being selectively actuated in response to a predetermined temperature to short-circuit said coils.

2. In an automobile generator, an armature shaft having a central bore, a thermal responsive switch in said bore, coils positioned about said armature shaft, said switch being located within the confines of said coils, means operatively connecting said coils to said switch, said switch comprising a hollow cylinder of electrically non-conductive material having end closure walls of non-conductive material, one of said end closure walls having a plurality of apertures therein, an electrically conductive strip in one of said apertures and extending into the hollow portion of said cylinder, contact means adjustably secured to said strip, a bimetallic electrically conductive strip in another of said apertures extending into said hollow portion and adapted to contact said contact means when subjected to a predetermined temperature, said means being electrically connected to said electrically conductive strips.

3. In an automobile generator, an armature shaft having a central bore, apertures in said shaft in communication with said central bore, a thermal responsive switch in said bore, coils positioned about said armature shaft, said switch being located within the confines of said coils, and means operatively connecting said coils to said switch, said means extending through said apertures, said switch selectively short circuiting said coils in response to a predetermined temperature.

DANIEL J. SMITH.

REFERENCES CITED

The following references are of record in the file of this patent:

UNITED STATES PATENTS

| Number | Name | Date |
|---|---|---|
| 397,006 | Kester | Jan. 29, 1889 |
| 1,547,382 | Gourdier et al. | July 28, 1925 |
| 1,664,089 | Ringwald | Mar. 29, 1928 |
| 1,930,539 | Renshaw et al. | Oct. 17, 1933 |
| 2,102,538 | Kinkaid | Dec. 14, 1937 |